Patented Mar. 8, 1932

1,848,155

UNITED STATES PATENT OFFICE

NORRIS BOEHMER, OF CHICAGO, ILLINOIS, ASSIGNOR TO VAN SCHAACK BROS. CHEMICAL WORKS, INC., OF CHICAGO, ILLINOIS, A CORPORATION OF ILLINOIS

ESTERS OF SECONDARY BUTYL ALCOHOL

No Drawing.   Application filed May 31, 1930.   Serial No. 458,910.

This invention relates to esters of secondary butyl alcohol with the polycarboxylic acids, particularly to those of such high boiling point as to be useful as plasticizers in pyroxylin compositions. An example is di-secondary butyl phthalate. Compounds of this sort are characterized by a marked solvent power for nitrocellulose and a comparatively low vapor pressure at ordinary temperatures which enable them to remain in the lacquer films for long periods of time. The secondary alcohol contemplated in this invention may readily be synthesized from inexpensive raw materials in large quantities; for example, it may be made by treating suitable fractions of the gases resulting from cracking petroleum with sulfuric acid and subsequently with water.

The esters may conveniently be prepared by heating phthalic anhydride or other di or polycarboxylic acid or anhydride with secondary butyl alcohol, preferably in the presence of a catalyst, removing the water formed by a distillation process, thus causing the hydrogen of all the carboxyl groups of a given molecule to be replaced by the secondary butyl groups, then neutralizing unreacted acid, and distilling under vacuum to effect further purification of the product. Thus a substantially neutral ester is obtained. Since the solubility of water in the alcohol is considerable, the removal of water from the reaction is facilitated by the addition of hydrocarbons, such as benzol or toluol, fractionating, condensing the fractionated vapors, separating into two layers, returning the upper layer to the still, and continuing until little or no additional lower layer of condensate forms.

The following description of the manufacture of sec-butyl phthalate illustrates one method by which the materials comprised in this invention may be prepared.

One hundred and forty-eight parts by weight of phthalic anhydride are heated to boiling with 170 of secondary butyl alcohol in the presence of 1.8 of sulfuric acid and 20 of toluol. The vapors given off, upon condensing, separate into two layers. The lower, aqueous layer is withdrawn and the upper one, consisting mainly of sec-butyl alcohol and toluol, is returned to the reaction mixture continuously. The sec-butyl hydrogen phthalate, which first forms, reacts with additional alcohol to form di-sec-butyl phthalate with the elimination of water, the removal of which, as described, enables the reaction to proceed. When water no longer separates, the heating is stopped, and the reaction mixture is washed with several portions of sodium carbonate solution and the resulting lower layer drawn off, until the mixture is substantially neutral. It may then be subjected to vacuum distillation to purify the ester.

Such purified di-sec-butyl phthalate is a clear, substantially colorless, viscous liquid, boiling at 182°–184° C. under a pressure of approximately 10 mm. of mercury. Di-sec-butyl phthalate dissolves nitrocellulose, of the grades commonly used in lacquers, in the cold or warm condition. It is compatible with many oils, ester gum, or dewaxed dammar resin. Di-secondary butyl phthalate is useful therefore, as an ingredient of pyroxylin compositions.

Instead of an amount of secondary butyl alcohol equal to, or somewhat in excess of, the combining requirements of the polycarboxylic acid, as set forth in the example given, a lesser amount may be supplied, say sufficient to replace one carboxyl hydrogen with the secondary butyl radical. The remaining carboxyl groups may be reacted with some other alcohol, as for example hexyl, amyl, benzyl, or ethoxyethyl alcohol, ethylene glycol, glycerol, and the like. In the case of acids having more than two carboxyl groups, two or more may be caused to react with secondary butyl alcohol and the remainder reacted with other alcohols. Since all of the carboxyl hydrogen atoms are replaced in such esters, they are substantially neutral in their pure form.

The examples given are merely illustrative, and the same general method of preparation is applicable to other compounds within the purview of this invention. In place of phthalic anhydride other polycarboxylic acids or their anhydrides, of either the aliphatic or aromatic series, may be employed in proportions preferably slightly less than the combining requirements of the alcohol. Thus glutaric or pimelic acids may be combined with secondary butyl alcohol to form di-secondary butyl glutarate or pimelate. Esters of acids having aromatic groups such as terephthalic acid, methyl-phthalic acid or phenyl succinic acid are also within the purview of this invention, as are those of hydroxy acids such as malic acid or tartaric acid. Secondary butyl esters of unsaturated acids such as maleic acid or of acids having more than two carboxyl groups, as, for example, citric acid or trimesic acid, are not precluded.

These esters that I have invented are compounds of relatively low volatility and comparatively high boiling point. They are relatively stable at ordinary temperatures. They are miscible with alcohols, hydrocarbons, and many other esters but are insoluble in water, except in the case of esters of hydroxy-acids of relatively low molecular weight.

For use as plasticizers in nitrocellulose lacquers, it is necessary that the esters remain in the film for long periods of time. Thus esters having boiling points below 265° C. at atmospheric pressure are not desirable and it is preferable that the boiling point be above 300° C. For those esters that decompose at or below the temperature of boiling at atmospheric pressure, I may determine the boiling point at reduced pressure. A boiling point, under a pressure of 10 mm. of mercury, of not less than, say, 170° C. is desirable if the secondary butyl ester is to be used as a plasticizer. All of the aromatic esters of the type described fulfill these conditions.

Typical compositions in which secondary butyl esters of polycarboxylic acids are used as plasticizers in pyroxylin lacquers follow:

*Lacquer No. 1*

|  | Parts by weight |
|---|---|
| Pyroxylin | 2 |
| Di-sec. butyl phthalate | 1 |
| N-butyl acetate | 4 |
| Ethyl acetate | 2 |
| Toluol | 10 |
| Total | 19 |

These esters are also serviceable in plasticizing lacquers containing resins or gums, and are entirely compatible therewith.

*Lacquer No. 2*

|  | Parts by weight |
|---|---|
| Lacquer No. 1 | 19 |
| Ester gum (paramet) | 2 |

*Lacquer No. 3*

|  | Parts by weight |
|---|---|
| Lacquer No. 1 | 19 |
| Dewaxed dammar (in solution) | 2 |

Wide variations are permissible in the proportions of pyroxylin, gum, and plasticizer, as well as in the composition of the solvent mixture. Also, pigments, stabilizers, oils, and/or other ingredients may be added, as well known to one skilled in the art of pyroxylin compositions. Thus, other plasticizers, softeners such as castor oil, or both may be included in the formula along with the secondary butyl phthalate. Secondary butyl esters of other polycarboxylic acids may be substituted for the phthalate.

Resins and/or gums other than those named may be employed, for example the copals, or gum elemi, or synthetic resins.

I claim:

1. A secondary butyl ester of a polycarboxylic acid.
2. A secondary butyl ester of a polycarboxylic aromatic acid.
3. Di-secondary-butyl phthalate.
4. A substantially neutral secondary butyl ester of a polycarboxylic acid.
5. A substantially neutral secondary butyl ester of a polycarboxylic aromatic acid.
6. A substantially neutral secondary butyl ester of a polycarboxylic acid said ester having a boiling point above 265° C. at atmospheric pressure.
7. A substantially neutral secondary butyl ester of a polycarboxylic aromatic acid said ester having a boiling point above 265° C. at atmospheric pressure.
8. A substantially neutral secondary butyl ester of a polycarboxylic acid said ester having a boiling point above 300° C. at atmospheric pressure.
9. A substantially neutral secondary butyl ester of a polycarboxylic aromatic acid said ester having a boiling point above 300° C. at atmospheric pressure.
10. A substantially neutral secondary butyl ester of a dicarboxylic aromatic acid.
11. A substantially neutral secondary butyl ester of a dicarboxylic aromatic acid said ester having a normal boiling point above 250° C.
12. A substantially neutral secondary butyl ester of a dicarboxylic aromatic acid said ester having a normal boiling point above 300° C.

13. An ester of a polycarboxylic acid in which at least one carboxyl hydrogen has been replaced by the secondary butyl radical.

14. A substantially neutral ester of a polycarboxylic acid in which at least one carboxyl hydrogen has been replaced by the secondary butyl radical.

15. A substantially neutral ester of a polycarboxylic acid in which at least one carboxyl hydrogen has been replaced by the secondary butyl radical, said ester having a boiling point above 265° C. at atmospheric pressure.

16. A substantially neutral ester of a polycarboxylic acid in which at least one carboxyl hydrogen has been replaced by the secondary butyl radical, said ester having a boiling point above 300° C. at atmospheric pressure.

NORRIS BOEHMER.